US007527300B2

(12) United States Patent
Li

(10) Patent No.: US 7,527,300 B2
(45) Date of Patent: May 5, 2009

(54) FLEXIBLE TUBING CONNECTOR

(75) Inventor: William W. Li, Miami, FL (US)

(73) Assignee: Beckman Coulter, Inc., Fullerton, CA (US)

(*) Notice: Subject to any disclaimer, the term of this patent is extended or adjusted under 35 U.S.C. 154(b) by 175 days.

(21) Appl. No.: 11/210,353

(22) Filed: Aug. 24, 2005

(65) Prior Publication Data

US 2007/0052231 A1    Mar. 8, 2007

(51) Int. Cl.
*F16L 33/00* (2006.01)
(52) U.S. Cl. .................................. 285/247; 285/332
(58) Field of Classification Search ............... 285/246, 285/247, 248, 332.1, 332, 242, 245
See application file for complete search history.

(56) References Cited

U.S. PATENT DOCUMENTS

| | | | | |
|---|---|---|---|---|
| 235,580 | A * | 12/1880 | Smith et al. ............. | 285/148.17 |
| 1,235,876 | A * | 8/1917 | Cave ........................... | 285/247 |
| 2,300,464 | A * | 11/1942 | Parker ..................... | 285/148.13 |
| 2,367,447 | A * | 1/1945 | Strout ......................... | 285/247 |
| 3,704,704 | A * | 12/1972 | Gonzales .................... | 128/831 |
| 4,437,689 | A | 3/1984 | Goebel et al. | |
| 4,736,969 | A | 4/1988 | Fouts | |
| 4,875,719 | A | 10/1989 | Mylett | |
| 4,887,847 | A | 12/1989 | Barnoach | |
| 4,951,976 | A | 8/1990 | Boelkins | |
| 5,178,423 | A | 1/1993 | Combeau | |
| 5,364,135 | A * | 11/1994 | Anderson ..................... | 285/38 |
| 5,378,023 | A | 1/1995 | Olbrich | |
| 5,622,393 | A | 4/1997 | Elbich et al. | |
| 6,003,906 | A * | 12/1999 | Fogarty et al. .............. | 285/242 |
| 6,017,066 | A * | 1/2000 | Giuffre' ..................... | 285/247 |
| 6,145,892 | A | 11/2000 | Weber | |
| 6,209,804 | B1 | 4/2001 | Spriegel | |
| 6,641,177 | B1 * | 11/2003 | Pinciaro ..................... | 285/242 |
| 6,773,038 | B2 | 8/2004 | Villano et al. | |
| 6,860,521 | B2 | 3/2005 | Berg | |

* cited by examiner

*Primary Examiner*—David E Bochna
(74) *Attorney, Agent, or Firm*—Sterne, Kessler, Goldstein & Fox P.L.L.C.

(57) ABSTRACT

A connector for use in securing a length of flexible tubing with another object is set forth. The connector comprises a fitting and a collar. The fitting includes a neck that is adapted to receive the flexible tubing thereon. The neck, in turn, includes an exteriorly disposed barb for engaging the interior walls of the flexible tubing. The collar is adapted to engage the fitting at least about the neck and barb and includes an interiorly disposed flange portion having a contour that is shaped to cooperate with the surfaces of the barb to drive the flexible tubing over the barb and the neck as the collar and fitting are assembled with one another. The shape and contour of the flange portion also cooperates with the surfaces of the barb to provide a compressive force that may be used to provide a seal between the flexible tubing and neck. For example, the compressive force may be used to prevent disengagement of the flexible tubing and neck where the contents of the tubing is pressurized and/or where a pulling force is exerted on the tubing with respect to the neck. In one embodiment, the flange portion has a generally hour-glass shaped cross-section with smooth overall contour.

16 Claims, 3 Drawing Sheets

FLEXIBLE TUBING CONNECTOR

FIELD OF THE INVENTION

Generally stated, the present invention is directed to a connector for flexible tubing. More particularly, the present invention includes a connector for flexible tubing having an improved collar and fitting arrangement.

BACKGROUND OF THE INVENTION

Flexible tubing is used in a wide range of applications, particularly in automated laboratory equipment. The tubing can act as a conduit for a variety of processing liquids and gases. It can also act as a conduit for the liquids and gases used to operate other pneumatic and/or hydraulic devices, such as, valves, pumps, etc.

Mechanical connectors are used to secure each end of the flexible tubing with a corresponding fluid source or port of the laboratory equipment. A connector structure that may be used to connect a flexible hose to the bulkhead of a tank is shown in U.S. Pat. No. 6,209,804, issued to Spriegel on Apr. 3, 2001. The connector of the '804 Patent includes a fitting having a barb and a compression nut that threads with a body portion of the fitting. The flexible hose is first assembled with the fitting so that the hose extends completely over and beyond the end of the barb. The compression nut is then threaded into engagement with the body portion of the fitting so that the flexible hose is clamped between the outer surface of the barb and the inner surface of the compression nut. The outer surface of the barb and the inner surface of the compression nut have generally the same contour so that they are substantially parallel with one another when assembled.

Connectors of the type shown in the '804 patent are prone to failure and are frequently the source of equipment breakdowns that require service calls. Failure modes vary, but are often the result of improper installation of the flexible tubing over the end of the barb on the fitting. Frequently, the flexible tubing is not completely driven over and beyond the barb to the necessary degree before the compression nut and fitting are threaded with one another. Over time, the end of the flexible tubing within the connector gradually becomes displaced thereby resulting in fluid leaks.

Another failure mode occurs when the connector is used with old tubing. Due to the repair or other service needs, the connector may be disassembled and the flexible tubing removed from engagement with the fitting. Unless the flexible tubing is itself defective, it is economical to reuse and reinstall the connector with the same tubing. However, the end portion of the tubing previously clamped between the fitting and compression nut may be permanently deformed as a result of its prior use. Such deformities may make it more difficult to reinstall the flexible tubing over and beyond the barb to the necessary degree for the connector to function properly. Even if the flexible tubing is properly engaged with the fitting, any weakening of the tubing walls may make it difficult for the fitting and compression nut to secure the tubing therebetween.

SUMMARY OF THE INVENTION

A connector for use in securing a length of flexible tubing with another object is set forth. The connector comprises a fitting and a collar. The fitting includes a neck that is adapted to receive the flexible tubing thereon. The neck, in turn, includes an exteriorly disposed barb for engaging the interior walls of the flexible tubing. The collar is adapted to engage the fitting at least about the neck and barb and includes an interiorly disposed flange portion having a contour that is shaped to cooperate with the surfaces of the barb to drive the flexible tubing over the barb and the neck as the collar and fitting are assembled with one another. The shape and contour of the flange portion also cooperates with the surfaces of the barb to provide a compressive force that may be used to provide a seal between the flexible tubing and neck. For example, the compressive force may be used to prevent disengagement of the flexible tubing and neck where the contents of the tubing is pressurized and/or where a pulling force is exerted on the tubing with respect to the neck. In one embodiment, the flange portion has a generally hour-glass shaped cross-section with smooth overall contour.

DESCRIPTION OF A PREFERRED EMBODIMENT OF THE INVENTION

Figure 1:
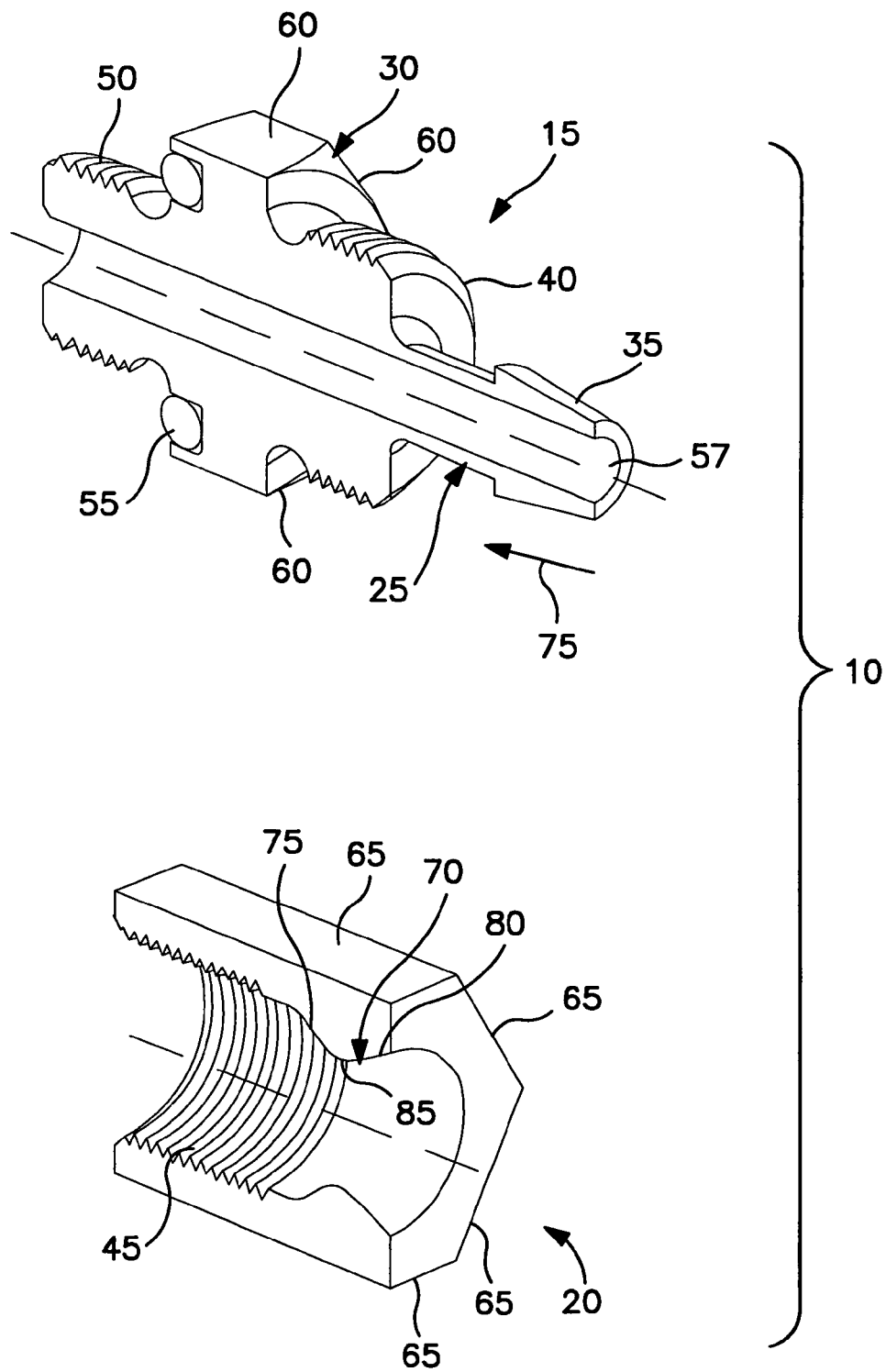
FIG. 1 is a cross-sectional view of the components of one embodiment of a connector constructed in accordance with the teachings of the present invention.

FIG. 1 illustrates the components of a disassembled connector 10 in accordance with one embodiment of the present invention. In this embodiment, connector 10 is comprised of a fitting 15 and a collar 20, both of which are shown in cross-section in FIG. 1. Fitting 15 includes a neck 25 that extends axially from a main body portion 30 and that terminates at a barb 35. Main body portion 30 includes a threaded section 40 that is adapted to engage a corresponding threaded section 45 of collar 20 for assembly of the fitting 15 and collar 20 with one another. Body portion 30 may also include a further threaded section 50 to facilitate linking of the connector 10 with other objects (i.e., other connectors, pumps, drives, sample I/O, etc.). Fluid leakage between body portion 30 and such other objects may be inhibited by seal 55. A central aperture 57 extends axially through body portion 30 and serves as the principal conduit for fluid flow through the connector 10.

The ease with which the connector 10 may be assembled and/or linked with other objects may be enhanced through the provision of a plurality of tool engagement surfaces 60 that, for example, allow the fitting 15 to be rotated or retained from rotation by a corresponding tool (i.e., wrench, customized tool, etc.). Collar 20 may also include a plurality of tool engagement surfaces Collar 20 includes an interiorly disposed flange 70 that has a contour that is shaped to drive flexible tubing over barb 35 and neck 25 in the direction of arrow 75 as the collar 20 and fitting 15 are assembled with one another. Flange 70 may have a generally hour-glass shaped cross-section comprising a first inwardly contoured surface 75 and a second inwardly contoured surface 80 that are joined by a smooth shoulder 85.

Figure 2:
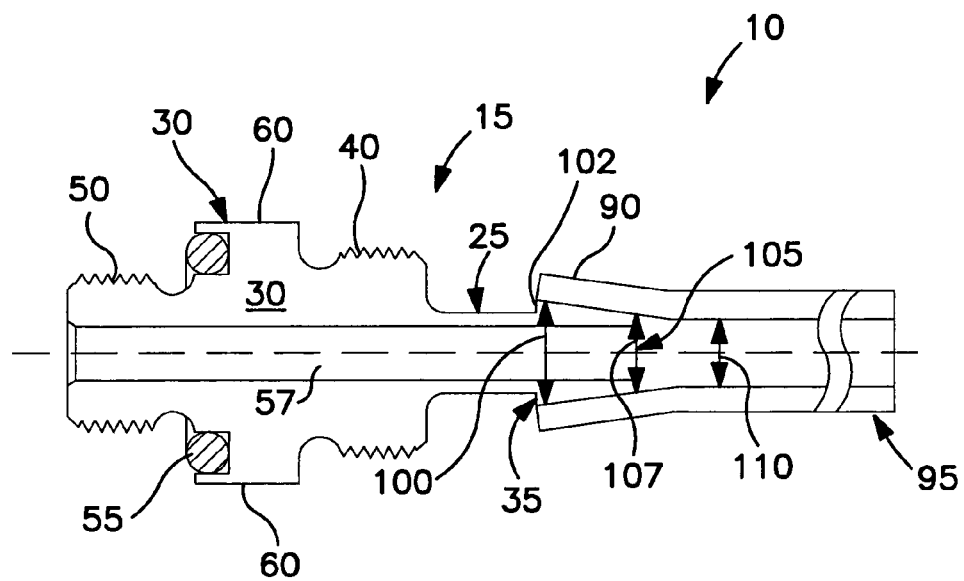
FIG. 2 is a cross-sectional view of the fitting of FIG. 1 with an end of flexible tubing disposed partially over the neck portion of the fitting.

FIGS. 2 through 5 are cross-sectional views through connector 10 at various states of assembly. As shown in FIG. 2, an end portion 90 of a length of flexible tubing 95 is fitted over the end of barb 35 to an initial assembly position by the user. Barb 35 may be frustoconical with a first outer diameter 100 proximate base 102 and a second outer diameter 105 proximate end 107. Outer diameter 105 may have the same dimension or may be just slightly larger than the interior diameter 110 of tubing 95 to thereby allow the user to initially place the tubing 95 on fitting 15. Once the end of barb 35 is inserted into the open end of flexible tubing 95, the user may continue to drive the end portion 90 either completely over and beyond barb 35 or to the initial assembly position illustrated here. In the initial assembly position, the opening of flexible tubing 95 is proximate the base 102 of the frustoconical barb 35. Outer diameter 100 is larger than diameter 105 thereby causing end portion 90 to conform itself to the shape of barb 35.

Figure 3:
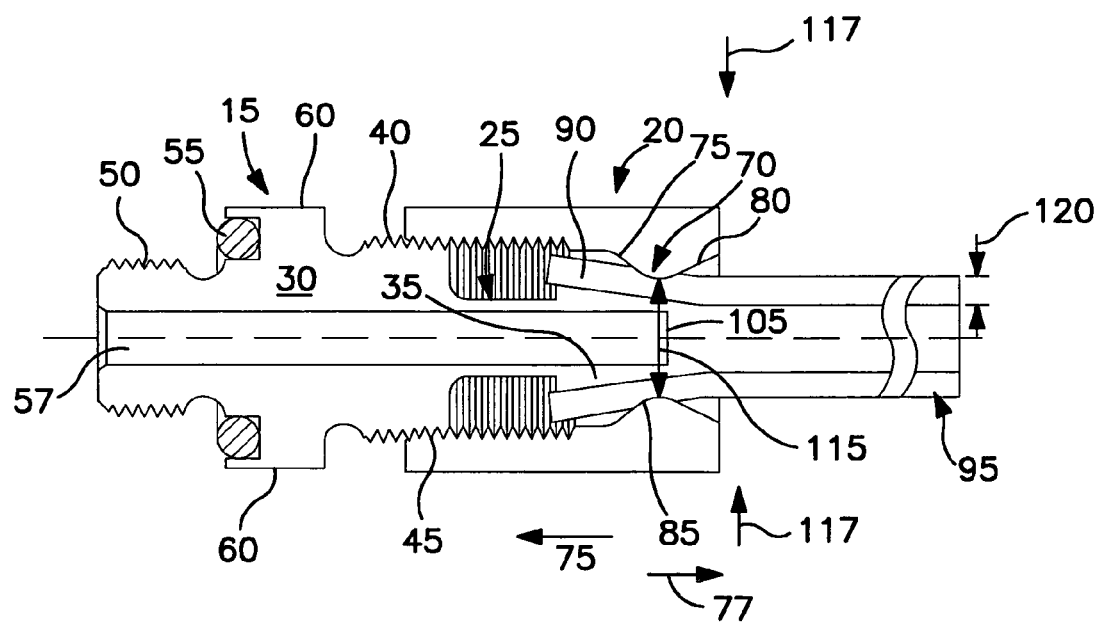
FIG. 3 is a cross-sectional view of the fitting and collar of FIG. 1 at an initial engagement position with a length of flexible tubing disposed partially over the neck portion of the fitting as shown in FIG. 2.

FIG. 3 shows the fitting 15 and collar 20 in an initial state of assembly. In this state, only at few of the threads of threaded portions 40 and 45 are engaged with one another. Flange 70 is proximate end 107 of barb 35 and is engaged with the outer wall of end portion 90 of tubing 95. Inwardly contoured surfaces 75 and 80 gradually diminish the interior dimension of collar 20 until joining at shoulder 85. The interior diameter 115 of collar 20 at shoulder 85 and the contour of surfaces 75 and 80 are selected so that the walls of tubing 95 are radially compressed in the direction of arrows 117 and laterally compressed in the direction of arrows 75 and 77 between the flange 70 and the outer surfaces of barb 35 proximate end 105. To this end, the difference between exterior diameter 107 and interior diameter 115 should be less than the thickness 120 of tubing 95 near this location. As a result of this combined radial and lateral compression, end portion 90 is grasped and moved in the direction of arrow 75 by an amount that generally corresponds with the degree to which threaded sections 40 and 45 overlap one another.

Figure 4:
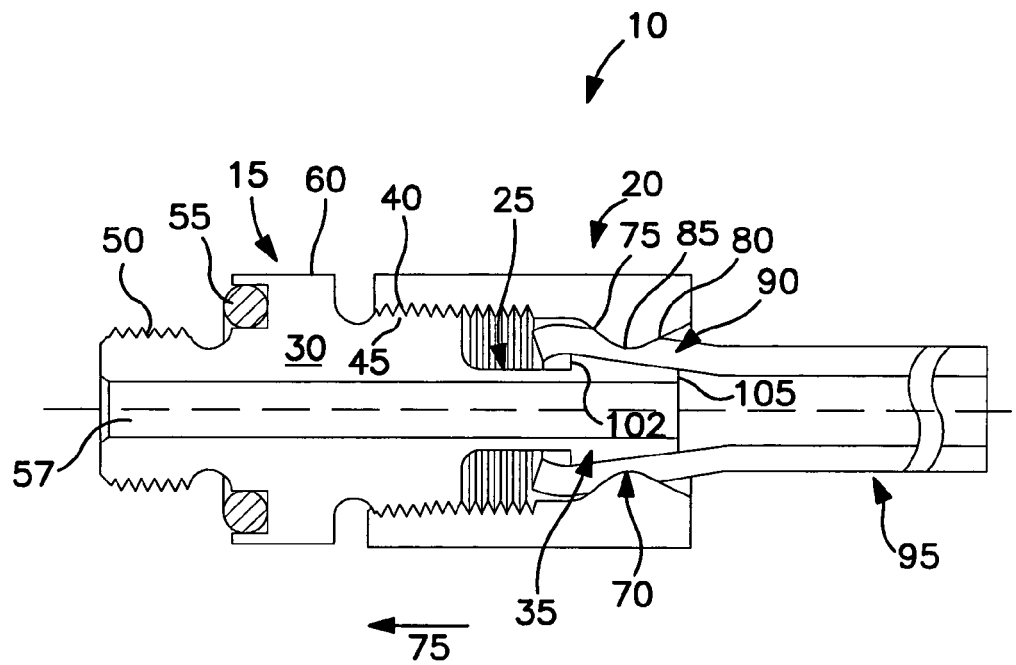
FIG. 4 is a cross-sectional view of the fitting, collar, and tubing of FIG. 3 at an intermediate engagement position.

FIG. 4 shows the connector 10 at a more advanced stage of assembly than shown in FIG. 3. In this more advanced stage, collar 20 and fitting 15 are driven into further engagement with one another and the overlap between threaded sections 40 and 45 increases. End portion 90 is continuously grasped between the outer surfaces of barb 35 and the surfaces of flange 70 as the fitting 15 and collar 20 are threaded with one another. As a result, end portion 90 of the flexible tubing 95 is pulled in the direction of arrow 75 so that it extends beyond the base 102. At this point, the section of end portion 90 extending beyond base 102 is no longer directly subject to the outward radial forces imposed by barb 35. Consequently, end portion 90 attempts to return to its original shape and size.

Figure 5:
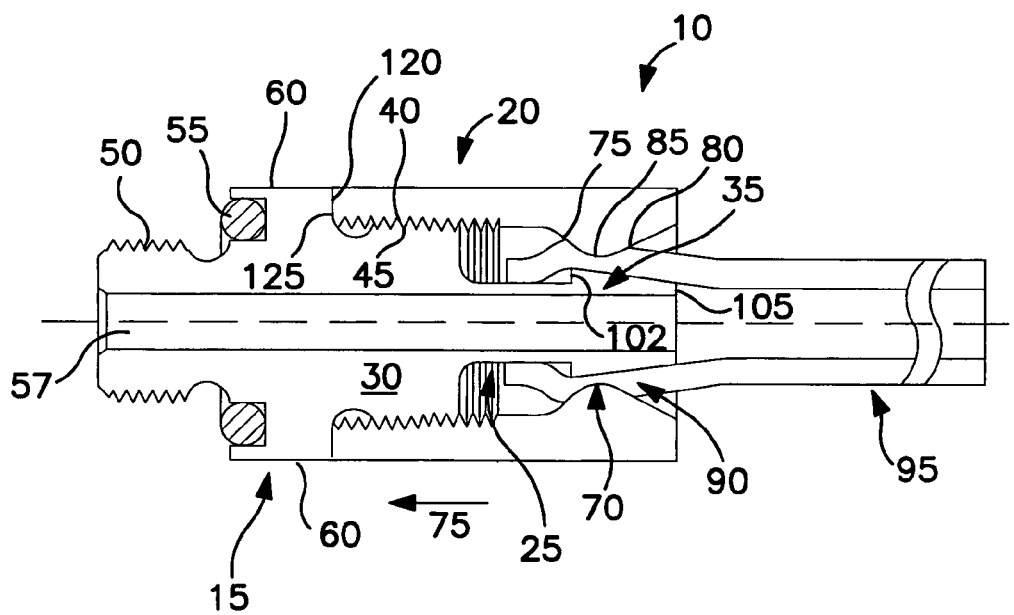
FIG. 5 is a cross-sectional view of the fitting, collar, and tubing of FIG. 3 at a final engagement position.

FIG. 5 shows the connector 10 in its final, assembled state. In this state, fitting 15 and collar 20 have been driven into engagement with one another so that end 120 of collar 20 abuts stop flange 125 of fitting 15. The shoulder 85 of flange 70 is now proximate end 102 of barb 35 and the end portion 90 of tubing 95 is both radially and laterally compressed and secured between outer surfaces of barb 35 and the interior surfaces of flange 70. End portion 90 has also been driven to a position in which it further extends beyond base 102 of barb 35. Preferably, the section of end portion 90 beyond base 102 extends a sufficient distance beyond barb 35 so that it regains much of its original shape and thereby conforms to and seals with the outer surface of neck 25.

In this state of the illustrated embodiment, the flange 70 may also cooperate with the surfaces of the barb 35 to provide compressive forces that may be used to provide a seal between the tubing 95 and neck 25. For example, the compressive force may be used to prevent disengagement of the flexible tubing 95 from neck 25 where the contents of the tubing is pressurized and/or where a pulling force is exerted on the tubing 95 with respect to the neck 25.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. A connector for flexible tubing comprising:
   a fitting having a neck adapted to receive said flexible tubing thereon, said neck having an exteriorly disposed barb for engaging an interior wall of said flexible tubing; and
   a collar adapted to engage said fitting at least about said neck and barb, said collar including an opening and an inwardly contoured surface at the opening providing an interiorly disposed flange portion having a generally hour-glass shaped contour that is shaped to cooperate with exterior surfaces of said barb to drive said flexible tubing over said barb and said neck as said collar and fitting are assembled with one another, wherein the interiorly disposed flange portion is provided as a radial flange that is free from intersection with any axial flange,
   wherein said fitting and said collar engage one another at a threaded connection.

2. A connector as claimed in claim 1 wherein said flange portion and the exterior surfaces of said barb cooperate to provide compressive forces that seal said flexible tubing with said neck.

3. A connector as claimed in claim 1 wherein the generally hour-glass shaped contour is smooth.

4. A connector as claimed in claim 1 wherein said fitting comprises a central aperture that extends axially through said neck.

5. A connector as claimed in claim 1 wherein the maximum inward extension of said flange and the maximum outward extension of said barb are proximate one another when said fitting and said collar are in a final engaged relationship.

6. A connector for flexible tubing comprising:
   a fitting having a body portion and a neck portion, said neck portion adapted to receive said flexible tubing thereon, said neck portion having an exteriorly disposed barb for receiving said flexible tubing thereover; and
   a collar adapted to assemble with said fitting at said body portion, said collar further extending about said neck portion and said barb, said collar including an opening and an inwardly contoured surface at the opening providing an interiorly disposed flange having a generally hour-glass shaped cross-section that cooperates with exterior surfaces of said barb to drive said flexible tubing over said barb and said neck portion in the direction of said body portion as said collar and said fitting are assembled with one another;
   wherein said collar engages said body portion of said fitting at a threaded connection.

7. A connector as claimed in claim 6 wherein said generally hour-glass shaped cross-section is smooth.

8. A connector as claimed in claim 6 wherein said fitting comprises a central aperture that extends axially through said body portion and said neck portion.

9. A connector as claimed in claim 6 wherein the maximum inward extension of said flange portion and the maximum outward extension of said barb are proximate one another when said fitting and said collar are in a final engaged relationship.

10. A connector for flexible tubing comprising:
a fitting having a neck adapted to receive said flexible tubing thereon, said neck having an exteriorly disposed barb for engaging said flexible tubing; and
a collar adapted to engage said fitting at least about said neck and barb said collar including an opening and an interiorly disposed radial flange portion having a contour that is shaped to cooperate with exterior surfaces of said barb to direct said flexible tubing over said barb and said neck as said collar and fitting are driven into engagement with one another, said interiorly disposed radial flange portion having a first inwardly contoured surface at the opening and a second inwardly contoured surface, the first and second inwardly contoured surfaces joined at a continuous smooth shoulder
wherein said fitting and said collar engage one another at a threaded connection.

11. A connector as claimed in claim 10 wherein said shoulder and said first and second inwardly contoured surfaces form a generally hour-glass shaped cross-section.

12. A connector as claimed in claim 10 wherein said fitting comprises a central aperture that extends axially through said neck.

13. A connector as claimed in claim 10 wherein the maximum inward extension of said shoulder and the maximum outward extension of said barb are proximate one another when said fitting and said collar are in a final engaged relationship.

14. A connector for flexible tubing comprising:
a fitting having a neck adapted to receive said flexible tubing thereon, said neck having an exteriorly disposed barb for engaging an interior wall of said flexible tubing; and
a collar adapted to engage said fitting at least about said neck and barb, said collar including an opening and an inwardly contoured surface at the opening providing an interiorly disposed radial flange portion providing an hour-glass contour that is shaped to apply both radial and lateral compressive forces to said flexible tubing and against exterior surfaces of said barb as said collar and fitting are assembled with one another,
wherein said fitting and said collar engage one another at a threaded connection.

15. A connector as claimed in claim 14 wherein said radial flange portion providing the hour-glass contour is the only interiorly disposed flange portion included on the collar.

16. A connector as claimed in claim 15 wherein hour-glass contour is smooth.

* * * * *